United States Patent [19]

Troutman, Jr. et al.

[11] Patent Number: 4,535,634

[45] Date of Patent: Aug. 20, 1985

[54] MANOMETER

[75] Inventors: S. J. Troutman, Jr.; D. Wayne Hixenbaugh, both of Albuquerque, N. Mex.

[73] Assignee: Dynatech Frontier Corporation, Albuquerque, N. Mex.

[21] Appl. No.: 614,055

[22] Filed: May 25, 1984

[51] Int. Cl.³ .............................................. G01L 7/18
[52] U.S. Cl. ......................................... 73/747; 73/431
[58] Field of Search ................ 73/747, 748, 749, 750, 73/431

[56] References Cited

U.S. PATENT DOCUMENTS

| | | | |
|---|---|---|---|
| 914,666 | 3/1909 | Maurer | 73/747 |
| 917,276 | 4/1909 | Faught | 73/748 |
| 1,821,902 | 9/1931 | Baum | 73/748 |
| 1,909,296 | 5/1933 | Meriam | 73/747 |
| 2,167,449 | 7/1939 | Ganser | 73/747 |
| 3,150,524 | 9/1964 | Arens | 73/747 |
| 3,473,387 | 10/1969 | Meriam | 73/747 |

*Primary Examiner*—Donald O. Woodiel
*Attorney, Agent, or Firm*—Cesari and McKenna

[57] ABSTRACT

Manometer apparatus includes an elongated rigid channel-like frame for protectively enclosing a manometer tube. The frame is formed with a plurality of internal longitudinal slides for supporting a planar or curved scale, a scale adjust slider and a transparent front plate which enables the same frame to be used in a variety of different manometer configurations. The frame may be used in conjunction with a well adjustably mounted relative to the frame and a fluid connection is established between the tube enclosed within the frame and the interior of the well by an accessible small-volume fluid conduit. Several different manometer versions using the same basic frame are disclosed.

30 Claims, 12 Drawing Figures

MANOMETER

This invention relates to apparatus for indicating fluid pressure, level and flow. It relates more particularly to manometer apparatus which can be used in a variety of different configurations for different applications where such instruments are required.

BACKGROUND OF THE INVENTION

A manometer is a pressure-measuring instrument which balances fluid heads in a glass tube positioned opposite a scale. Pressure readings are taken by noting the registry of a maniscus or manisci with an indicated location or locations on the scale. In its simplest form, the manometer consists of a U-tube, one end of which is open to the atmosphere and the other end of which is open to the region where the pressure is to be measured. If the measured pressure is different from atmospheric pressure, the fluid with which the manometer tube is partially filled will stand higher in one leg of the tube than the other. The U-tube manometer indicates pressure as the vertical distance from the top of the fluid (i.e. the maniscus) in one leg to the top of the fluid (i.e. the maniscus) in the other leg. For ease of reading, the scale on this manometer is graduated from a center zero location toward each end of the scale and the distances from zero are added to obtain a pressure reading in inches of mercury, pounds per square foot or in other conventional units of pressure. If one leg of the tube is filled with indicating fluid, evacuated and sealed, the reading on a suitably calibrated scale will indicate the pressure at the open end of the tube in absolute pressure units, i.e. barometric pressure.

In a well-type manometer, one leg of the U-tube is in the form of a well which has much larger diameter than the other leg, i.e., the sight or indicating tube which is juxtaposed to the scale. As a result, a great change in column height in the indicating tube is accompanied by a minor change in the level of the well contents which change is referred to as the well-drop. This drop is corrected by the graduations on the scale. Thus the scale of a well-type manometer, although it may be graduated in terms such as inches of mercury, will not measure exact linear inches. Instead, the scale incorporates a correction factor which is identified as the well-drop factor and thus it reads out accurately directly in the units of measurement, e.g. inches of mercury. The well-type manometer offers many advantages in terms of convenience and versatility. For example, the design permits use of a direct-reading single indicating tube. This means that the pressure, vacuum, fluid flow or fluid level reading is taken directly from a single indicating column rather than by a measure of the difference between two column levels as in the U-tube manometer. By raising the well above the bottom of the indicating tube, the zero reading may be located at any specific point on the scale, say at eye level, so that readings above that point indicate pressure and readings below that point measure vacuum.

It is also a characteristic of a manometer that the vertical height of the fluid in the tube controls the range of the manometer. To obtain a more sensitive reading, then, the leg containing the fluid indicating column, i.e. the indicating tube, may be inclined and juxtaposed to an inclined scale, the remaining tube leg (or the well) remaining vertical. In this so-called inclined manometer, the inclined scale will expand the same range over a much longer scale so that there are more scale graduations per inch of vertical height which allows the scale to be read more easily and with more accuracy.

In practice, the above described different types of manometers are used in a variety of different settings. Some are supported on a table or other horizontal surface. Some are mounted to a wall or panel, being either back mounted, flush mounted or recessed. All manometers require plumbing and most are used with different accessories such as manifolds, valves, etc. depending upon the particular application.

The manometers available heretofore have tended to be relatively complex and costly instruments. This is because they are composed of numerous parts, many of which are machined parts made of hard, corrosion-resistant metals such as stainless steel in order to withstand the corrosive fluids to which they are exposed. Many have complicated scale adjust mechanisms involving flexible cables, rack and pinion mechanisms and the like. Some well-type instruments require an excessive amount of indicating fluid. One of the principal reasons for the high costs of prior manometers is due to the fact that even the instruments made by a given manufacturer do not have components which are interchangeable between the different manometer types, e.g. U-tube manometer, well-type manometer, inclined manometer, etc. Resultantly, not only are each manufacturer's parts costs for a complete line of manometers quite high, but also his inventory costs are excessive because he must maintain a complete supply of all the different spare parts for his entire line of instruments.

Some instruments also present a maintenance problem. For example, it is especially difficult to properly clean the prior well-type manometers, particularly their fluid pathways between the transparent indicating tubes and the wells. In the case of some manometers, many of their parts are welded together, making it difficult to gain access to the interiors of those instruments in order to repair and service them.

Also, as alluded to above, a manometer may have to be mounted in different ways depending upon the circumstances. In some cases, it must rest on a horizontal platform; in other situations, it must be mounted to a vertical wall or panel with a possibility of having to protrude from, be flush with or be recessed into the wall or panel surface. The prior instruments of this general type are not readily adapted to all of these mounting possibilities. Furthermore, prior manometers have tended to be rather large and bulky. Therefore, when several have to be mounted side by side in a row, they occupy a relatively large amount of wall or panel space.

Additionally, many conventional manometers have constructions and configurations which make it difficult to change their scale or to adjust the scale to zero. Some prior manometers are difficult to read. This is often due to the fact that their indicating tubes are retained in place by clips or brackets which obscure the scale or the tube maniscus. Sometimes, it is due to the fact that their scale graduations are located beside, rather than behind, the indicating tubes so that parallax errors are introduced into the readings from such instruments.

It would be desirable, therefore, if a single manometer design could be devised to address all of the aforesaid problems.

SUMMARY OF THE INVENTION

Accordingly, the present invention aims to provide a manometer construction which is characterized by its flexibility and versatility.

Another object of the invention is to provide a manometer which is composed of a minimum number of easily assembled and disassembled components most of which are relatively inexpensive molded or extruded parts.

A further object of the invention is to provide a manometer which is relatively small and compact.

Still another object of the invention is to provide an instrument of this type many of whose parts are interchangeable from one type instrument to another.

Another object of the invention is to provide a manometer which is easy to clean and otherwise maintain and service.

Yet another object of the invention is to provide a manometer instrument which is easy to calibrate and to read accurately.

A further object of the invention is to provide a manometer of the well type which requires a minimum amount of excess fluid in the well.

Still another object of the invention is to provide a manometer which can be mounted easily in a variety of different ways and, when several are mounted side by side, they occupy a minimum amount of space.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The instruments to be described in detail herein, including the simple sight gauge, the U-tube manometer, the well-type manometer and the inclined manometer, all use the same inexpensive extruded frame structure to support their glass indicating tubes. End caps are releasably secured to the opposite ends of each instrument frame forming a strong, but lightweight, housing that protectively encloses the tube. Usually, those end parts are molded of a suitable lightweight impact-resistant plastic material so that they are relatively inexpensive to make in quantity. All of the requisite fluid connections to the opposite ends of the tube are made through threaded fittings formed in one or both of the end caps as will be described in detail later. As will be seen, the tube ends are always aligned with those fittings so that the interior of the tube can be cleaned easily from outside the manometer housing by a brush inserted through a fitting.

The housing frame is also designed to slidably support a card-like manometer scale adjacent the tube and which can be inserted through one end of the frame prior to the securement of the end cap there. In the case of the single indicating tube instrument, the frame maintains the scale in a cross-sectionally curved or flexed condition behind the tube so that the side margins of the scale curve forwardly or wrap around the opposite sides of the tube, bringing the scale graduations and indicia closer to the viewer. Furthermore, the scale graduations extend behind the manometer tube so that readings may be taken by sighting directly across the maniscus in the tube to the graduations with the result that there are no parallax errors introduced into the readings from the instrument. When necessary, a simple scale adjust mechanism is provided for adjustably positioning the manometer scale along its frame parallel to the tube therein so that the manometer can be calibrated prior to use.

The instrument frame also defines a slide at the front of the housing for receiving a transparent plate in the event that it is desired to provide a protective wall in front of the manometer tube. This is often done to protect personnel from flying glass in the event that the manometer tube shatters under excessive pressure. The manometer housing is vented through holes in the frame end cap so that the disrupting force is directed away from personnel in front of the instrument.

The universal frame used in all of applicants' instruments has, in addition, a longitudinal keyway in its rear wall which enables the manometer to be supported in a variety of different ways. Thus, the manometer may be keyed to an upright stand provided with a level adjustment to assure that the manometer is oriented vertically. It may also be keyed to brackets secured to a vertical wall or panel so that the manometer is mounted in front of or to the rear of or flush with the exposed wall or panel surface.

In the well-type versions of applicants' manometer, that very same frame keyway is used to support the well at the desired elevation on the manometer housing relative to the indicating tube therein. In that event, the lower end cap on the frame is substituted for by a subassembly which establishes a short, low-volume fluid connection between the well and lower end of the tube. That subassembly is composed of a few inexpensive molded parts which are releasably secured together so that they can be disassembled quite readily in order to clean the fluid path between the well and the indicating tube. As will be seen, that short, small-volume, pathway between the tube and the well enables that manometer to operate properly with a minimum amount of indicating fluid. This can result in considerable cost saving when the indicating fluid is an expensive one such as mercury.

The present manometer instruments have other advantages which add further to their versatility. For example, the manometer components are designed so that they can be made equally easily by molding them of plastic or stainless steel or machining them of other corrosion-resistant materials. Therefore, if certain parts have to be made of stainless steel in a particular application, they can be substituted on a one-for-one replacement basis. Indeed, some of the more complex parts can still be made of plastic and provided with stainless steel liners on those surfaces exposed to the corrosive fluid. Also, the accessories such as valves and manifolds commonly associated with those instruments can be mounted directly to the manometer frame in lieu of one of the end caps. This eliminates the need for installing connecting tubing and maintains the manometer structure within a relatively small envelope.

All of the above features combine to produce manometer instruments which are especially flexible and versatile at a relatively low cost so that they should find wide application wherever a direct measurement of fluid pressure, fluid flow or fluid level is required.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF THE PREFERRED EMBODIMENTS

Figure 1:
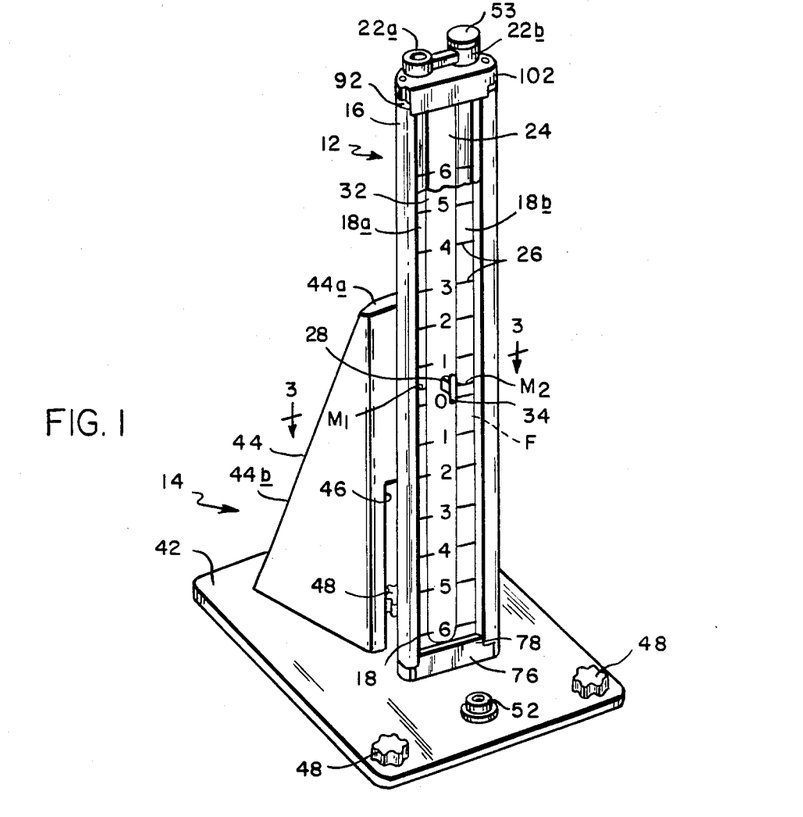
FIG. 1 is a perspective view of a U-tube manometer made in accordance with this invention shown supported by a table stand.

Refer first to FIG. 1 which shows a U-tube manometer made in accordance with this invention. The manometer indicated generally at 12 is supported in an upright position by a stand shown generally at 14 which rests on a table or other horizontal surface. Manometer 12 comprises a rigid housing 16 which encloses a glass tube 18 bent into the shape of a long narrow U. The tube rests on the bottom wall of the housing and its legs 18a and 18b extend the entire length of the housing. The open upper ends of legs 18a and 18b connect to internally threaded pipe fittings 22a and 22b in the top wall of housing 16 and the tube is partially filled with an indicating fluid F such as mercury or a mineral oil mixture so that the fluid forms manisci $M_1$ and $M_2$ midway along the tube legs 18a and 18b. When both legs are vented to the atmosphere through fittings 22a and 22b, the pressure applied to both tube legs is the same and, accordingly, the manisci $M_1$ and $M_2$ are located at the same height on tube 18 as shown. When the pressure applied to one tube leg, say leg 18a through its fitting 22a, is greater than the pressure applied to the other leg 18b, some of the fluid F will be pushed from leg 18a into leg 18b and the length of that added column of fluid in the latter leg is directly proportional to the difference in the pressure applied to the two legs.

A scale 24 is positioned in housing 16 behind tube 18. The scale has a series of vertically spaced apart lines or graduations 26 which extend behind both tube legs 18a and 18b and a series of easily readable numbers located between the tube legs and associated with the graduations 26 so that the numbers indicate pressure in conventional terms such as inches or millimeters of mercury, inches of water, etc. The scale 24 specifically illustrated has a ZERO (0) reading midway along the scale with numbers 1, 2, 3, etc. extending above and below the ZERO reading showing the pressure differential on the two tube legs 18a and 18b. A reading is taken by adding the scale numbers opposite the two manisci $M_1$ and $M_2$.

Scale 24 is slidable lengthwise in housing 16. This is so that, when the manisci $M_1$ and $M_2$ are at the same level indicating that the pressure applied to the two tube legs is the same, the scale can be shifted up or down in housing 16 in order to position its ZERO graduation line directly behind manisci $M_1$ and $M_2$ to calibrate or zero set the manometer. A small tab 28 projects out from the front face of the scale midway therealong to facilitate adjusting the scale as aforesaid. Thus to calibrate the instrument depicted in FIG. 1, the scale 24 must be slid upwards in housing 16 using tab 28 until its ZERO graduation is aligned with manisci $M_1$ and $M_2$.

Figure 2:
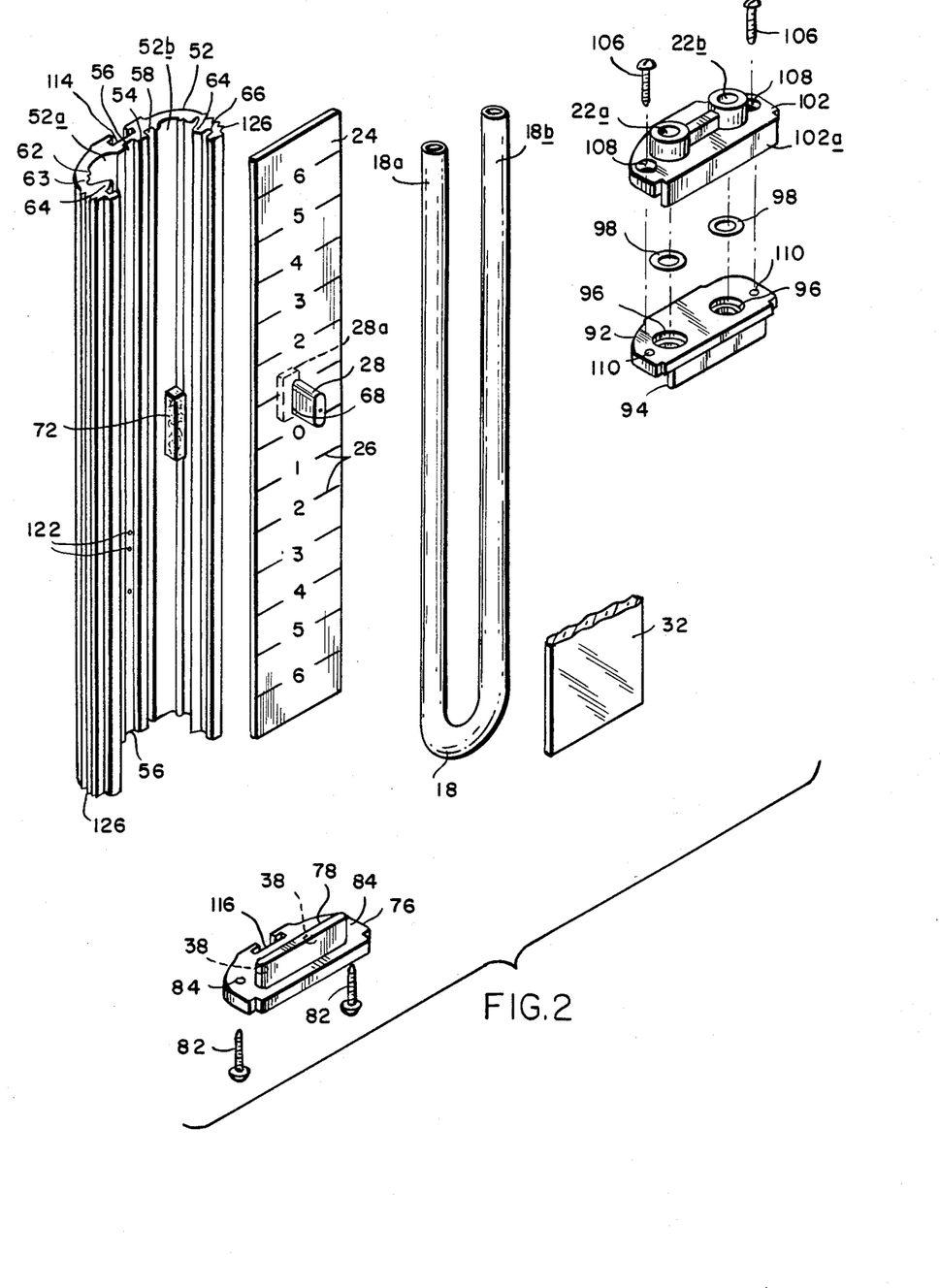
FIG. 2 is an exploded perspective view on a somewhat larger scale of the FIG. 1 manometer.
Figure 3:
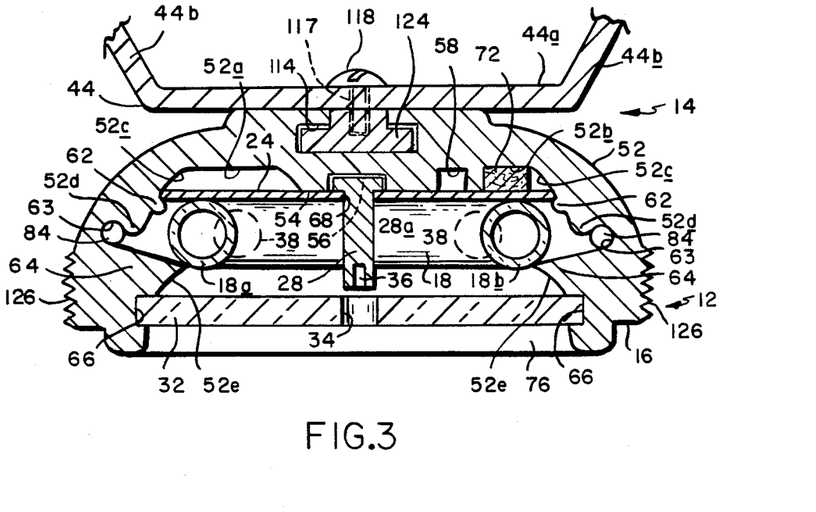
FIG. 3 is a sectional view on a larger scale along line 3—3 of FIG. 1.

There are occasions when tube 18 breaks or shatters such as when a pressure surge is applied to the manometer. To protect passers-by from flying glass, housing 16 is fitted with a front panel or wall 32 made of a rigid transparent material such as Plexiglas plastic. That panel 32 is provided with a small vertical slot 34 directly opposite the scale adjust tab 28. The forward end of tab 28 is located just inside plate 32 but a small hole 36 (FIG. 3) is present in the end of the tab so that the user can insert a pin or stylus through slot 34 into hole 36 in order to vertically adjust the scale 24. As seen in FIGS. 2 and 3, a pair of vent holes 38 are present in the bottom wall of housing 16 so that any excess pressure developed inside the housing due to breakage of tube 18 will not shatter plate 32 and will be directed downwardly away from personnel in front of the manometer.

Still referring to FIG. 1, the stand 14 comprises a base 42 in the form of a flat rectangular plate. A standard 44 projects up perpendicularly from base 42 near the rear of the base. The standard has a transverse midsection 44a and opposite tapered side margins which are bent back to form splayed wings 44b so that, even though it is made of relatively small gauge sheet metal, the standard is a very rigid channel structure which firmly supports manometer 12. A vertical slot 46 is formed near the bottom of the standard section 44a to provide clearance for certain components of a well-type manometer that will be described in detail later.

Manometer 12 rests on base 42 and is releasably connected to standard 44 so that it is supported parallel to the standard, i.e. perpendicular to base 42. In order to assure that the instrument 12 is oriented vertically in use, means are provided for leveling standard 14. More particularly, three thumbscrews 48 are threaded through its base 42, two being located at the front corners of the base and one being positioned midway along its rear edge. By appropriately turning the screws 48, base 42 can be tilted side to side and/or front to rear in order to level the stand 14, which condition can be observed by the centering of the bubble in a button level 52 mounted to base 42.

Manometer 12 can be used to measure pressures above or below barometric pressure by connecting fitting 22a or 22b to the measured pressure source and venting the opposite fitting. The instrument will also measure the pressure difference between two sources when those two sources are connected to fittings 22a and 22b respectively. Further, since a pressure differential is proportional to fluid flow, the scale 24 can be graduated to indicate such flow directly in conventional terms such as cubic feet per minute. If one tube leg, say leg 18b, of the manometer tube 18 is filled with indicating fluid F, evacuated and sealed by closing fitting 22b with a threaded plug shown at 53 in FIG. 1 and the other fitting 22a is vented to the atmosphere, manometer 12 will function as an absolute pressure manometer or barometer with an appropriately graduated scale 24 indicating the barometric pressure, i.e. pressure above zero absolute pressure, wherever the instrument 12 is located.

Referring now to FIGS. 2 and 3, manometer 12 is composed of an unusually small number of parts which are relatively easy and inexpensive to manufacture and to assemble. As seen there, the manometer housing 16 comprises a rigid frame 52 made of suitable lightweight metal such as aluminum. This same frame can be used in all of the different versions of applicants' manometer to be described here. Although it has a relatively complex cross-sectional shape, it can be made quite inexpensively since it can be cut to length from a single long extrusion. Frame 52 is generally channel shaped, making it quite rigid and resistant to racking or bending. The frame is especially shaped so that it can support and enclose tube 18, its scale 24 and the transparent plate 32 so that those components of the manometer do not require any retaining clips, pins or other fasteners which would be time consuming to install and which could obstruct the observer's view of the manometer tube or the scale, thus making it more difficult to read the manometer.

As best seen in FIG. 3, frame 52 is formed with a flat longitudinal raised interior surface or pad 54 which extends the entire length of the frame at the rear thereof. The pad has a longitudinal slot 56 and a second longitudinal slot 58 is located to the right of slot 56 as viewed in FIG. 3. The interior wall of the frame extends generally laterally from opposite sides of pad 54 to form flat surfaces at 52a and 52b and then that wall curves forwardly along more or less mirror-image curved surfaces 52c to a pair of rounded mirror-image noses 52d. Midway across each such surface is a rib 62 that extends the entire length of the frame. Just forwardly of noses 52d are a pair of mirror-image grooves 63 which lie directly opposite one another at the opposite sides of the frame. The frame interior side walls then extend inwardly toward one another just beyond grooves 63 to form pronounced inwardly extending lips 64. Those lips are formed with leading surfaces 52e which have negative curvature, i.e. they are concave in cross section. Those surfaces have the same radius such that, if a circular arc of that radius is drawn from one surface 52e to the other, the arc will be more or less tangent to the longitudinal centerline of pad 54. Just forwardly of lips 64 are a pair of mirror image grooves 66 which open toward one another at opposite sides of the frame adjacent its leading edges.

All of the aforesaid grooves and prominences cooperate in one way or another to facilitate assembly of the manometer and to properly support the various components thereof. More particularly, the card-like scale 24 which is an inexpensive photographically etched metal or plastic part is installed in frame 52 by sliding it into the end of the frame adjacent pad 54 at the rear of the frame. The width of the scale is such that its side edges engage behind ribs 62 thereby capturing the scale between those ribs and pad 54. This prevents the scale from shifting laterally or tilting in the frame.

The scale adjust tab 28 is releasably connected to scale 24 rather than being fastened thereto. More particularly, the rear end of tab 28 has a flange 28a. Also, an elongated hole 68 is punched through scale 24 near the middle of the scale which hole is shaped to snugly receive the tab with the flange 28a seating against the rear face of the scale. When the scale is slid endwise into the frame 52 as described above, the tab flange 28a is slidably received in the frame slot 56 thereby locking tab 28 to the scale.

As shown in FIG. 2, scale 24 is somewhat shorter than frame 52 so that, for calibration purposes, the scale can be slid vertically to a limited extent within the frame using the scale adjust tab 28. A small rubber or felt pad 72 is adhered to the frame interior wall surface 52b midway along the length thereof. Pad 72 projects out far enough to engage the rear surface of scale 24 to provide enough friction so that, when the scale is adjusted to a particular location along the frame, it will remain at that location even though the manometer may be bumped and jostled in use.

Still referring to FIGS. 2 and 3, the manometer tube 18 is slid into the end of frame 52 just behind lips 64. The spacing of the tube legs 18a and 18b is such that outboard sectors of those legs extend behind lips 64. Resultantly, the tube is positively captured along its entire length by those lips and held close to scale 24 without the lips obscuring the scale indicia or the graduations which extend directly behind the tube legs. Therefore, no separate clips or fasteners are needed to retain the tube in housing 16. The transparent manometer front plate 32 is slid endwise into the end of frame 52 at the locations of the grooves 66 therein with the opposite side edges of the plate being retained in those grooves.

The lower end of frame 52 is closed by a lower end cap 76 having an outline which is more or less the same as the cross-sectional outline of frame 52. The cap includes an upstanding fin 78 which is dimensioned and situated so that its side edges are slidably received in the frame grooves 66 when the end cap is seated properly against the bottom of the frame as shown in FIG. 1. The lower end of the tube 18 rests on cap 76 behind its fin 78 so that the fin more or less conceals the tube bridging segment which connects legs 18a and 18b. End cap 76 is releasably retained in place by self-tapping threaded fasteners 82 which extend through countersunk holes 84 in the end cap and are screwed into the lower ends of frame grooves 63 as best seen in FIG. 3.

The upper end of frame 52 is closed by a seal member 92 which also has the outline of the frame 52 cross section. Seal member 92 includes a depending fin 94 which engages in the frame grooves 66 above the transparent plate 32 and includes a pair of passages 96 whose spacing corresponds to the spacing between the tube legs 18a and 18b. When the seal member is seated on the upper end of the frame, the upper ends of the tube legs 18a and 18b project up into those passages and the passages are counterbored from above to receive O-ring seals 98. An upper end cap 102, in which the threaded fittings 22a and 22b are formed, engages over seal member 92. The front or leading edge of cap 102 has a depending flange 102a which engages over the leading edge of seal member 92 to align those two members so that fittings 22a and 22b and passages 96 and the tube ends are all in register. The seal 92 and end cap 102 are releasably secured to the frame 52 by threaded fasteners 106 which extend through countersunk holes 108 in the cap and through registering holes 110 in the seal member and are turned down into the upper ends of frame grooves 63. Since the seal member 92 and end caps 76 and 102 are usually molded plastic parts, they are relatively inexpensive to make in quantity.

Still referring to FIGS. 2 and 3, a longitudinal keyway 114 is formed in the outside rear wall of frame 52, extending the entire length of the frame. The lower end of that keyway registers with a keyway 116 present at the rear edge of the lower end cap 76. In the various versions of applicants' manometer, the keyway 114 is used for different purposes. In manometer 12, the keyway is used to mount the manometer to stand 14. More particularly, as shown in FIG. 3, one or more vertically spaced holes 117 are present in the midsection 44a of the stand standard 44. Screws 118 extending through these holes are turned down into threaded holes 122 in sliders or keys 124 at the front of the stand. The manometer is mounted to the stand by engaging the keys in frame keyway 114 and, with the manometer lower end cap 76 resting on stand base 42, tightening screws 118.

As seen in FIGS. 2 and 3, the exterior side walls of frame 52 are formed with longitudinal serrations 126 which provide gripping surfaces and give the lightweight manometer tactile feel so that a person handling it is less likely to drop the instrument. Also, as will be seen later, when a plurality of manometers 12 are mounted side by side in a row, the serrations 126 on the adjacent manometer frames interfit so that the adjacent manometers provide mutual support along their entire lengths.

As mentioned previously, the seal member 92 and end caps 76, and 102 are usually molded plastic parts. However, if those parts will be exposed to a corrosive fluid, they can be replaced on a one-for-one basis with identical parts made of stainless steel or other corrosive-resistant material. Alternatively, the illustrated plastic parts can be provided with corrosion-resistant liners at those surfaces exposed to the fluid, namely the walls of the passages 96 in seal member 92 and the interior walls of fittings 22a and 22b extending through cap 102. Of course, in that event, the O-ring seals 98 would also be made of a material able to withstand the corrosive effects of the particular fluid.

It will be apparent from the foregoing that the manometer 12 is very easy to service. The most frequent maintenance step involves cleaning the interior of its tube 18. This can be done quite easily because the legs of the tube are directly aligned with the fittings 22a and 22b. Therefore, the tube can be scrubbed from without by a brush inserted through those fittings. In the event that a different scale 24 is required for a particular application, it is only necessary to remove end cap by unscrewing its fasteners, slide out the old scale, slide in the new scale and then replace the end cap. Likewise, if tube 18 should break or plate 32 should become damaged or discolored, those components can be slid out of housing 16 and replaced in the same way. Thus, the construction of manometer 12 makes it quite easy to keep the instrument in top operating condition. Yet, when servicing is required, that can be accomplished quite quickly and at minimum cost so that the manometer suffers minimum downtime.

Figures 4, 5:
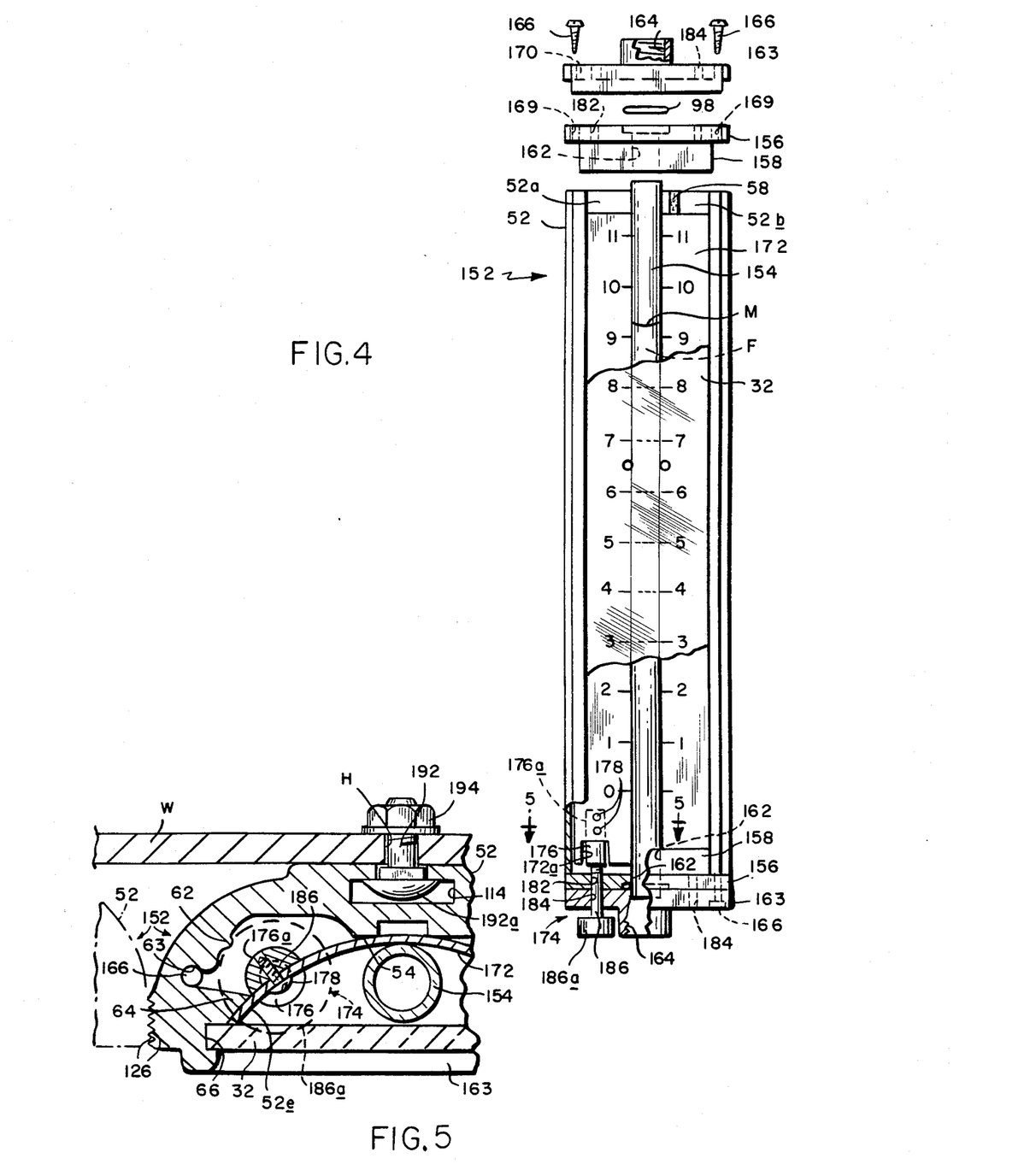
FIG. 4 is a front elevational view partially exploded and with some parts broken away showing the FIG. 1 manometer structure modified to form a sight gauge.
FIG. 5 is a sectional view on a larger scale along line 5—5 of FIG. 4.

Components of the U-tube manometer described above can also be used in other applications. FIGS. 4 and 5 depict such parts assembled to form a sight gauge indicated generally at 152. This is an instrument commonly used to measure the level of fluid in a tank or other container. Those parts of the sight gauge that also comprise the manometer 12 described above carry the same identifying numerals.

The main common component of the two instruments 12 and 152 is the frame 52 which is cut to a length to suit the particular application. Instead of employing a U-tube, the sight gauge 152 has a single straight indicating tube 154 which is slightly longer than the length of the frame and is located in the center of the frame. Identical closure means are employed to close the upper and lower ends of the frame. Each includes a seal member 156 having a fin 158 and is more or less the same as the above-described seal member 92 except that it only has a single central counterbored passage 162 for receiving the adjacent end of tube 154 and an O-ring 98 when the seal member is seated on the end of the frame. The other component of each closure is an end cap 163 which is more or less the same as cap 102 described above except that it only has a single central fitting 164 which registers with passage 162. The two end caps and their seal members are releasably secured to the opposite ends of frame 52 by threaded fasteners 166 which extend through registering holes 169 and 170 in the seal members and caps respectively and are screwed into the opposite ends of the frame grooves 63. This forms fluid-tight seals between the opposite ends of tube 154 and the end fittings 164, while securely retaining the tube so that it remains parallel to the longitudinal axis of the frame.

Prior to securing one of the end closures, the transparent plate 32 is slid into place in the frame grooves 66 as shown. Also, a scale 172 bearing indicia appropriate for measuring fluid level, i.e. graduated in inches or feet, is slid endwise into the frame behind tube 154. Scale 172 is slightly wider than, and mounted in frame 52 slightly differently from, scale 24 in FIG. 1. More particularly, scale 172 is formed with curvature to begin with or it is resiliently flexible so that it can be slid into the open end of the frame with its rear surface midsection lying against frame pad 54 and its side edge margins curving forwardly and engaging against the curved lip surfaces 52e as shown in FIG. 5.

Scale 172 is somewhat shorter than the frame so that it can be slid along the frame to a limited extent on pad 54 and surfaces 52e with the resilience of the scale and its frictional engagement with those surfaces tending to maintain the scale in any set position. If desired, a pad similar to pad 72 in FIG. 3 may be mounted to the frame surface 52b so as to engage the rear surface of the scale to help in that respect. After the scale and plate 32 are slid into the frame, the remaining seal member 156 and its end cap 163 are secured to the frame by fasteners 166 as described above to lock all of the sight gauge components in place.

The instrument 152 also includes a scale adjust mechanism shown generally at 174 for shifting the scale 172 lengthwise relative to tube 154 in order to calibrate the instrument. Mechanism 174 includes an internally threaded cylindrical clip 176 which is received in a notch 172a present at the bottom of the scale. The clip has an integral tab 176a which engages the rear surface of the scale above the notch and is secured thereto by threaded fasteners 178. Registering holes 182 and 184 are formed in the lower seal member 156 and end cap 166 respectively directly below clip 176 to receive a thumbscrew 186. Once the scale is seated in the frame, the thumbscrew 186 can be inserted through those holes and screwed into the clip 176 with the screw head 186a being accessible at the underside of cap 166 as shown in FIG. 3. The screw 186 has extra length so that a gap exists between its head 186a and the end cap permitting the screw to be pushed up and pulled down to a limited extent relative to the frame to effect the scale adjustment.

Those same holes 182 and 184 present in the seal member and cap at the top of the instrument, along with similar holes at the opposite sides of the upper and lower seal members and end caps serve as vents to prevent plate 32 blowout as described above in connection with manometer 12.

Like the manometer 12 described above, the sight gauge 152 can be mounted in a variety of different ways such as by way of the stand 14 (FIG. 1). In FIG. 5, it is shown mounted to the front of a wall or panel W with the flat rear surface of frame 52 lying flush against the front of that wall. It is retained there by appropriate fastener means engaged in its frame keyway 114. Specifically shown are a plurality of vertically spaced-apart round head, square necked bolts 192 whose heads 192a are received in the keyway 114 and whose rearwardly projecting shafts extend through appropriate holes H in wall W. After the manometer is positioned at the proper height on wall W, nuts 194 are tightened onto the bolts behind wall W as shown to securely anchor the instrument to the wall. Alternatively, the unit can be mounted to the wall using keys similar to the keys 124 depicted in FIG. 3.

In the simplest installation to describe, the vertical height of the sight gauge 152 is more or less equal to that of the container (not shown) whose contents are being gauged. The gauge is positioned vertically beside the container, the fitting 164 at the bottom of the gauge is connected by appropriate tubing to the interior of the container through its bottom wall and the fitting 164 at the top of the instrument is vented to the atmosphere. As the container fills with fluid F, part of that fluid will flow through the connecting tubing into tube 154 producing a maniscus M shown in FIG. 4 whose level on scale 172 will coincide with the level of the fluid in the container.

As noted above, the scale 172 is curved. Also, its scale numbers are located in pairs adjacent the sides of the scale with the graduation lines between each pair extending behind tube 154 as best seen in FIG. 4. This brings the scale numbers very close to the front of the instrument so that they are quite easy to see. Since the scale graduations extend between those numbers behind tube 154, accurate readings can be taken by sighting directly across maniscus M to the registering scale line. Further, as is the FIG. 1 manometer, the sight gauge 152 is very easy to maintain. Its indicating tube 154 is directly in line with the end fittings 164 so that the tube interior can be cleaned by inserting a brush through those end fittings. Since the entire instrument is held together only by the fasteners 166, it is quite easy to remove one of its end closures in order to replace the transparent front plate 32 or scale 172 or the tube 154 itself. Still further, the main components of the sight gauge, like those of the manometer, are simple extrusions or molded parts which usually can be fabricated quite inexpensively in quantity. If necessary, the seal members and end caps can be made of a corrosive-resistant material or be lined as described above to enable those components to withstand any corrosive fluids that might be passed through the instrument.

As alluded above, it might be desirable to mount several of the sight gauges 152 or the other instruments described herein side by side in a row. In this event, the frames of adjacent instruments can be mounted close enough so that their serrations 126 interfit as shown in FIG. 5 with the result that the adjacent instruments give mutual support all along their lengths. Because of this and their compact construction, the instruments can be packed more densely than is the case with conventional instruments of this general type. In other words, less wall space is required for a given row of instruments; e.g. ten of these instruments can fit in the same wall space as seven prior instruments of this type.

Figures 6, 7, 8:
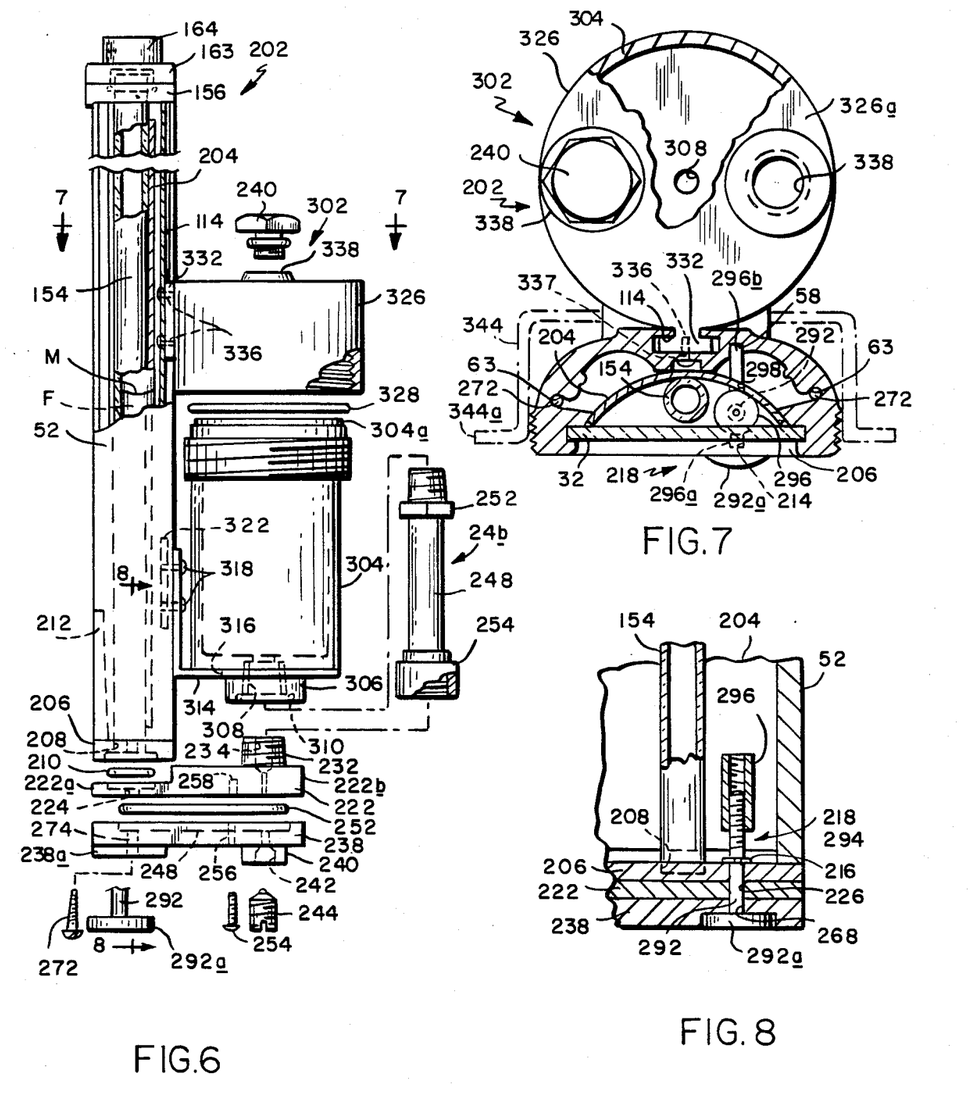
FIG. 6 is a side elevational view partly exploded and with some parts broken away of a well-type manometer made in accordance with this invention.
FIG. 7 is a sectional view along line 7—7 of FIG. 6.
FIG. 8 is a sectional view along line 8—8 of FIG. 6.

Many of the same parts described above can be used to make still other manometer instruments. In FIG. 6, a well-type manometer is shown generally at 202. As discussed at the outset, in a well-type manometer, one leg of the U-tube is substituted for by a relatively large diameter well so that a great change in the fluid column height in the indicating tube is accompanied by a minor change in the level of the fluid in the well. Like sight glass 152, manometer 202 has a frame 52 containing an indicating tube 154. The upper end of the frame is closed, but vented, by a seal member 156 and end cap 163 described above which make a fluid-tight connection between the upper end of the tube and the female fitting 164 in the end cap which is usually the low pressure connection to the well-type instrument. Manometer 202 contains a curved scale 204 which is slidably positioned in frame 52 just like the scale 172 discussed above. Scale 204 is, of course, graduated in units of pressure such as pounds per square inch, inches of mercury, etc.

Figure 9:
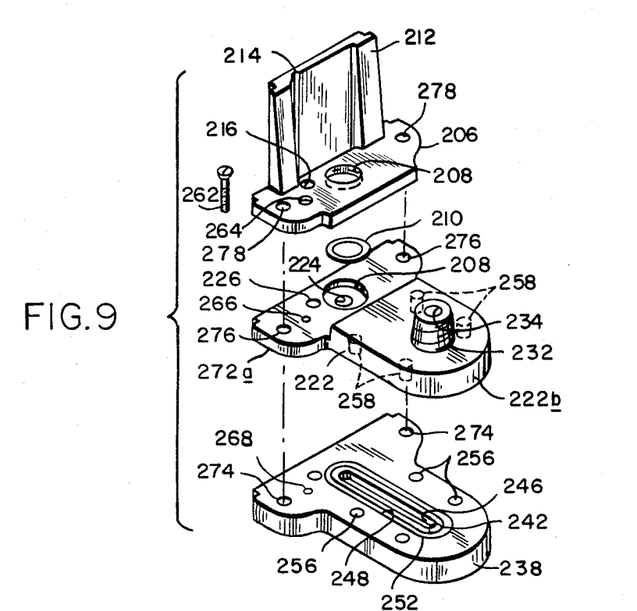
FIG. 9 is an exploded perspective view on a larger scale showing certain components of the FIG. 6 manometer in greater detail.

As best seen in FIGS. 6 and 9, a somewhat different seal member 206 closes the lower end of frame 52. Seal member 206, having the same general shape as the frame 52 cross section, includes a central passage 208 sized to receive the lower end of tube 154 and that hole is counterbored from below to accept an O-ring seal 210. The seal member 206 has an upstanding fin 212 which is somewhat narrower than the seal member per se and that fin is notched so that it can be slid into the frame grooves 66 under the transparent panel 32 when the seal member is seated against the lower end of the frame as shown in FIG. 6. A longitudinal groove 214 is present in the inner face of fin 212 directly opposite the slot 58 (FIG. 3) in the rear wall of frame 52. Also, a small hole 216 is drilled down through seal member 206 opposite groove 214. Both the slot 214 and the hole 216 accommodate a scale adjust mechanism shown generally at 218 in FIGS. 7 and 8 to be described in detail later.

Referring now to FIGS. 6, 8 and 9, positioned below the seal member 206 is a so-called well adapter 222. The adapter has a relatively thin forward portion 222a with the same general outline as seal member 206 arranged to engage under and register with that seal member. A small vertical passage 224 extends through portion 222a with its upper end counterbored to receive O-ring seal 210 when the adapter is seated against the underside of the seal member 206. Another small through hole 226 is present in portion 222a which registers with hole 216 in the seal member when the adapter is seated. The thicker rear portion 222b of the well adapter forms a relatively long tongue extending rearwardly from frame 52. Formed near the rear edge of that portion is an upstanding exteriorly threaded neck 232 having an axial bore 234. That bore continues down through the adapter portion 222b, although with a reduced diameter as shown in FIG. 6.

A third main component of the subassembly mounted to the lower end of frame 52 is a so-called scale adjust adapter 238 which has substantially the same outline as the well adapter so that, when it is engaged under and seated against the well adapter, the two are in register. The scale adjust adapter has a depending neck 240 located directly below neck 232 when the two adapters are in place. An interiorly threaded axial passage 242 extends up through neck 240 which passage is normally closed by a nylon tipped headless screw 244. That passage continues up through the adapter 238 per se, but with a lesser diameter (unthreaded) which more or less matches that of the reduced diameter segment of the passage 234 in the well adapter. Inscribed in the upper surface of the scale adjust adapter 238 is a straight narrow horizontal groove 246 which extends from the mouth of passage 242 forwardly along the adapter to a point near the front edge of that member which lies directly opposite passage 224 in the well adapter when the two adapters are in register. Surrounding slot 246 is an ovular groove 248 for receiving a ring seal 252 so that, when the scale adjust adapter 238 is seated against the underside of the well adapter 222 with the seal 252 sandwiched between them, a fluid-tight seal is formed all around groove 246.

The two adapters with the seal 252 between them are held together by four threaded fasteners 254 which extend up through holes 256 in the scale adjust adapter and are screwed into threaded relief holes 258 formed in the underside of the well adapter. A fifth, small threaded fastener 262 (FIG. 9) is inserted down through a countersunk hole 264 present in the seal member adjacent the hole 216 therein, through a registering hole 266 in the well adapter and is turned down into a threaded relief hole 268 present in the scale adjust adapter 238. Thus all of the instrument components at the lower end of the frame 52 can be stored and handled as a subassembly that is secured to the lower end of the frame 52 by two threaded fasteners 272 which extend up through registering holes 274, 276 and 278 in the scale adjust adapter, well adapter and seal member respectively and are screwed into the lower ends of the frame slots 63 as described above and shown in FIG. 7.

When the seal member and adapters are mounted to the bottom of the frame, there is a continuous fluid passage extending from the lower end of the indicating tube 154 through the passage 208 in the seal member and the passage 224 in the well adapter, along the groove 246 in the scale adjust adapter back up to the passage 234 at the back of the well adapter.

As best seen in FIGS. 8 and 9, the holes 216, 226 and 268 in the seal member, well adapter and scale adjust adapter respectively are all in register and arranged to slidably receive a scale adjust screw 292 which extends up into the frame adjacent the scale 204 therein and which is part of the scale adjust mechanism 218. The screw is held in place by a retaining clip 294 engaged in a circumferential groove (not shown) in the screw shaft located just above the upper surface of the seal member 206. The relatively large screw head 292a forms a thumb wheel which projects forwardly under the scale adjust adapter as best seen in FIG. 7.

The other component of the scale adjust mechanism 218 is a cylindrical metal or plastic nut 296 which is internally threaded to accept the threaded end of screw 292. As shown in FIG. 7, the nut has a relatively small integral tab 296a which extends forwardly from the nut so that it slidably engages in the groove 214 in the seal member fin 212. A second longer tab 296b extends from the rear of the nut, through a mating hole 298 in scale 204, into the slot 58 at the rear of frame 52. Thus, the nut is prevented from rotating by its tab-slot engagements in the seal member and frame, yet it is free to slide vertically in the frame as the adjusting screw 292 is turned in one direction or the other. Of course, when the nut is moved vertically in the frame, the scale 204 is shifted vertically relative to the indicating tube 154 so that the manometer can be calibrated by rotating screw 292 in one direction or the other. A skirt 238a (FIG. 6) extends down from adapter 238 around behind the screw head 292a to protectively enclose the head.

The manometer well in the FIG. 6 instrument is shown generally at 302 in FIGS. 6 and 7 and it is adjustably mounted to the rear of frame 52. The well comprises a generally cylindrical cup-like well body 304 having a neck 306 depending from its lower end. An axial passage 308 extends through neck 306 into the interior of body 304. The outer segment of that passage is threaded and sized to receive the upstanding threaded well adapter neck 232 when the well is connected directly to the adapter 222 (i.e., when the zero reading on scale 204 is to be located near the bottom of the manometer). Passage 308 is counterbored at its lower end to accept an O-ring seal 310 so that, when the well body is screwed onto the adapter, there is a fluid-tight seal between those two members and a fluid pathway from the adapter passage 234 into the interior of the well body. An L-shaped bracket 314 may be used to help support the well 302. The well body sits on one arm of bracket 314 which has an opening 316 to provide clearance for the well body neck 306. The other arm of the bracket is connected by threaded fasteners 318 to a key or slider 322 slidably engaged in the keyway 114 at the back of frame 52. Actually, when the well body seats directly on the adapter 222, the bracket 314 may be omitted if desired.

The upper end of the well body, which is exteriorly threaded, is closed by a generally cylindrical cap 326 whose lower end is open and internally threaded to receive the threads on the body. An O-ring seal 328 is arranged to engage over a reduced-diameter upper end segment 304a of the well body above the threads thereon so that, when the cap is screwed to the body, there is a fluid-tight seal between those two members. A key 332 projects forwardly from cap 326 which is arranged to slidably engage in the keyway 114 at the rear of the frame and threaded fasteners 336 extending through holes 337 at the rear of the frame are turned down into threaded holes in that key to anchor the well cap and thus the well as a whole to the frame.

As best seen in FIGS. 6 and 7, the upper wall 326a of cap 326 has a pair of similar, internally threaded fittings 338 for connecting the interior of the well to a fluid pressure source. This is usually the high pressure connection to the well-type manometer. If only one of these fittings is used in a particular application, the other one may be closed by an appropriate screw plug 240.

In use, the well body 304 is filled with indicating fluid F to a level about even with the top of its body 304. That fluid will, of course, flow out through the outlet passage 308 and through the fluid pathway defined by the above-described subassembly at the bottom of frame 52 into the lower end of the indicating tube 154 so that a maniscus M is formed at the same level in that tube. The scale 204 is adjusted vertically using the adjusting screw 292 so that the zero scale reading will be aligned with the maniscus M near the bottom of the manometer.

If it is desired to raise the zero reading on the manometer tube 154, i.e. the location of maniscus M at ambient barometric pressure, to a higher level on the tube, say to eye level, this simply involves positioning the well 302 at a higher location on frame 52. To do this, the well and its subassembly are detached from frame 52. Then an extender shown generally at 246 in FIG. 6 is connected between the well adapter 222 and the well body 304. The extender comprises simply a section of tubing 248 of the desired length having a female fitting 254 at its lower end threaded to receive the well adapter neck 232 and a male fitting 252 at its upper end similar to adapter neck 232 and arranged to screw into the passage 308 at the bottom of the well body. The subassembly and well are then secured to frame 52, with the bracket 314 and well cap 326, of course, being keyed to the frame at a higher elevation on its keyway 114. Additional indicating fluid F is added to the well to bring the maniscus M in the tube to the desired higher level. And, of course, when the well is raised in this fashion, a different scale 204 is required which has its zero reading at the elevated position on the manometer.

It should be noted also that the fluid pathway between the interior of the well body 304 and the manometer tube 154 is quite short and has a relatively small total volume. This means that only a minimum amount of indicating fluid F is required to fill the manometer enough to bring its maniscus M above the zero point on scale 204. If the indicating fluid is a relatively expensive one such as mercury, this can result in a considerable cost saving to the user.

Manometer 202 has all of the advantages described above in connection with the instruments depicted in FIGS. 1 and 4. Its well and the main parts connecting the well to the manometer tube can all be made of a suitable rugged lightweight molded or machined plastic material such as glass-filled polyester or nylon. As discussed earlier, if the manometer is likely to be exposed to a corrosive fluid, the affected surfaces can be provided with stainless steel liners or those components contacted by such fluid can be substituted for on a one-to-one basis by identical components made of corrosive-resistant material. Furthermore, all of the different components of the manometer 202 can be assembled quite easily without any special tools since they all interfit, screw together or are connected by a few threaded fasteners. The instrument is also easy to service. Tube 154 can be cleaned through its in-line top fitting 164. In the event that it is necessary to replace scale 204 or front plate 32 or the tube 154, it is only necessary to remove the upper end cap 163 and seal member 156 from the top of the frame by removing their two fasteners 166. Of course, if the scale is being removed, the adjusting screw 292 will have to be turned sufficiently to unscrew it from nut 296 to permit the scale and nut can be slid out through the upper end of the frame. The nut can then be separated easily from the scale and its tab 296a inserted through the hole 298 in the replacement scale.

Also, the indicating fluid can be drained quickly from the instrument by removing the screw 244 at the bottom of the scale adjust adapter 238. The well 302 and its subassembly can be separated from frame 52 simply by unscrewing the two fasteners 272 at the bottom of the scale adjust adapter and removing the key fasteners 336 (and 318 if present) which will allow the well to be slid from the lower end of the frame keyway 114. Removal of the fasteners 254 and 262 connecting the subassembly components gives ready access to the entire fluid pathway connecting the well 302 and the manometer tube 154 in the event that requires cleaning.

Manometer 202 can also be mounted to a stand or to a wall in the same manner as applicants' other instruments described above, or in other ways. For example, all the instruments can be mounted so that the front of the manometer is flush with a panel surface using one or more of the C-shaped brackets shown in dotted lines at 344 in FIG. 7. These are keyed into the frame keyway 114 in the same manner described above for stand 14, with the bracket tabs 344a being fastened to the rear of the panel.

Because of their modular construction, applicants' instruments are easy to modify to suit particular applications. For example, to adapt the FIG. 6 manometer 202 so that it can be transported from place to place without any loss of indicating fluid or other damage to the instrument, the standard manometer well cap 326 is replaced by a vented cap 352 shown in FIG. 10. The top wall 352a of the cap has an upstanding neck 354 with a stepped axial passage 356 that extends down to the underside of the cap. The lower end segment 356a of passage 356 has a small diameter and a flared upper end. The upper end segment 356b of that passage has a relatively large diameter and is threaded. Also, a pair of branch passages 358 lead at right angles from an intermediate segment 356c of passage 356 to internally threaded fittings 362 projecting from the side walls of the cap.

Figure 10:
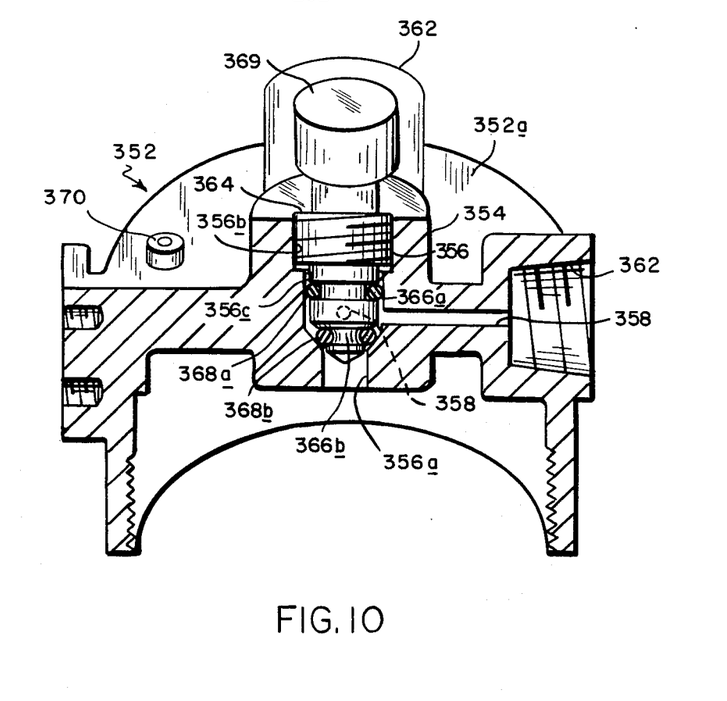
FIG. 10 is a sectional view with parts in elevation on a still larger scale of a modified well cap that may be used on the FIG. 6 manometer.

An exteriorly threaded stepped valve member 364 is arranged to screw down into passage 356. The valve member is circumferentially grooved at two axially spaced-apart locations 366a and 366b to accept O-ring seals 368a and 368b. When the valve member 364 is turned clockwise to its full extent, the seals 368a and 368b seat in their passage segments 356c and 356a respectively thereby closing passage 356 both above and below the branch passages 358 to the cap fittings. The valve member 364 is normally in that closed position when the manometer is being transported or moved about so there can be no fluid leakage from the well 302. When it is time to use the instrument, the valve member 364 is unscrewed by turning its exposed knob 369 counterclockwise sufficiently to connect passage segment 356a from the well to branch passages 358 leading to the fittings 362.

A button level 370 mounted to the cap top wall 352a helps to level that portable or transportable version of the manometer when it is being used in the field.

Figure 11:
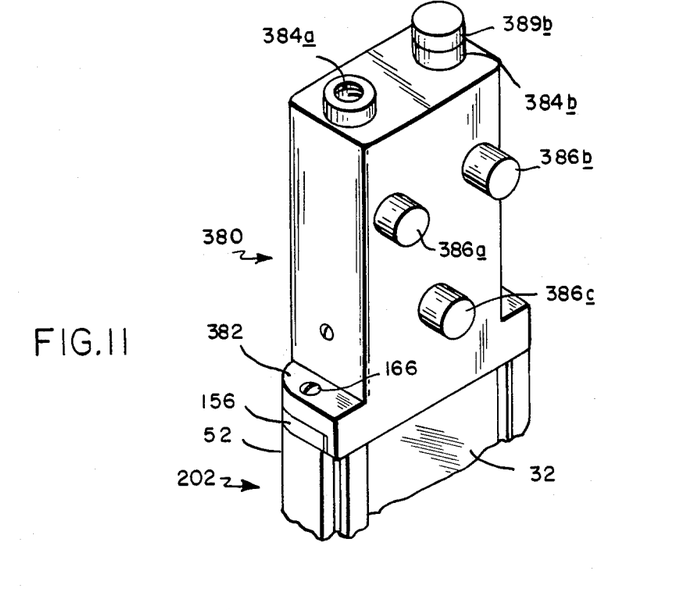
FIG. 11 is a perspective view on a larger scale showing a three-valve manifold mounted to the top of the FIG. 6 manometer.

FIG. 11 illustrates the ease with which commonly used accessories may be mounted to one or another of applicants' instruments. Instead of connecting these accessories to the manometer by relatively long lengths of tubing and other fittings as is done conventionally, they may be mounted directly to the upper end of the instrument frame 52. As shown there, a three-valve manifold 380 is mounted to the FIG. 6 manometer 202 in lieu of its upper end cap 163. The manifold 380 has a lower flange 382 whose outline is more or less the same as that of the manometer seal member 156 and it is connected to the upper end of frame 52 using the same fasteners 166. Aside from its configuration enabling it to mount directly to frame 52, the operation of manifold 380 is quite conventional and will not be described here. Suffice it to say that it has an internal passage that connects to the passage 162 (FIG. 4) in the seal member 156 leading to the manometer tube and it has additional internal passages leading to a pair of fittings 384a and 384b at the top of the manifold. Three internal valves controlled by knobs 386a, 386b and 386c control the routing of the fluid through the manifold so that communication is established between the manometer tube 154 and fitting 384a or 384b, with the ability to purge the fluid lines connected to either of those fittings. If one of the fittings is not being used, it may be closed by a threaded cap as shown at 389b in FIG. 11.

Figure 12:
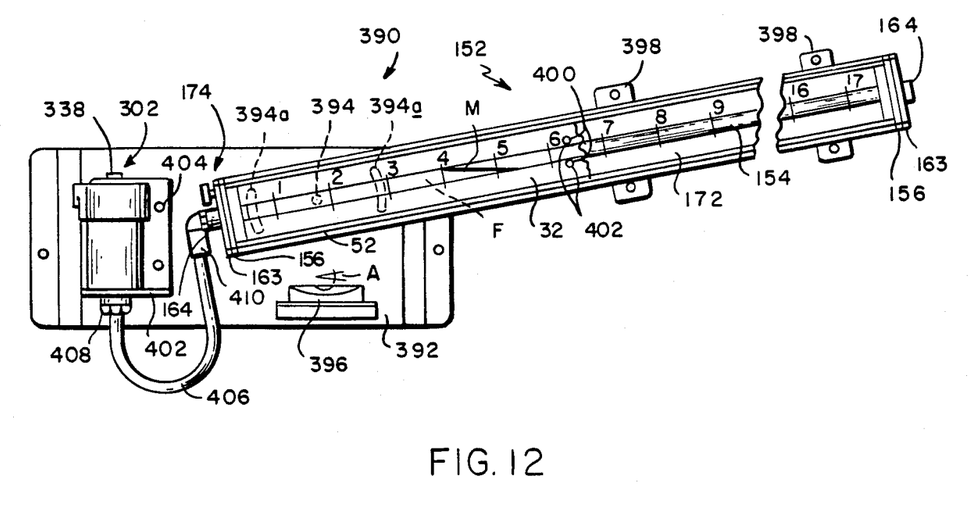
FIG. 12 is an elevational view of an inclined version of applicants' improved manometer.

FIG. 12 illustrates still another version of applicants' manometer, namely an inclined manometer shown generally at 390. Manometer 390 includes a sight gauge 152 which is substantially the same as the one described above in connection with FIG. 4. Its frame 52 is mounted to a stamped metal wall bracket 392 by keys similar to keys 124 in FIG. 3 or by fasteners similar to fasteners 192, 194 depicted in FIG. 5 which engage in the keyway 114 of the manometer frame 52. The bracket 392 has holes 394 and 394a to receive those fasteners, the latter holes bracketing hole 394 and being arcuate to permit angular adjustment of the manometer relative to the bracket. A bubble level 396 is also mounted to the bracket to assure that the bracket will be horizontal or level when anchored to the wall or panel. Additional brackets 398 spaced along the frame 52 secure the manometer to the wall all along its length.

Even though the tube 156 in the instrument is inclined, it is firmly supported within frame 52 by the frame lips 64 as described above. Therefore, the tube does not tend to sag. Only when the gauge 152 is quite long is additional support for the tube desirable. Such additional support may be provided by short glass pins 400 pressed into small holes drilled in front plate 32 on each side of tube 154 at one or two locations along the tube as shown as that they do not obscure the tube or the scale.

Manometer 390 also includes a well 302 of the type depicted in FIGS. 6 and 7. That well sits on an L-shaped bracket 402 located adjacent the lower end of the sight gauge 152 and is secured to that bracket by appropriate threaded fasteners 404. A tube 406 is connected at one end by a threaded fitting 408 to the well body passage 308 (FIG. 6). The opposite end of tube 406 is coupled to fitting 164 at the lower end of the sight gauge 152 by a threaded elbow fitting 410.

When the well 302 is filled with indicating fluid F, that fluid flows through tube 406 into the inclined indicating tube 154 creating an inclined maniscus M in that tube. The position of the maniscus along the tube is determined by the differential pressure between the high pressure well fitting 338 and the low pressure fitting 164 at the upper end of the manometer. As described above, the inclined manometer gives greater sensitivity and readability than a vertical manometer. Its scale 172 is expanded so that there are more graduations or lines on the scale per inch of vertical height, the expansion factor being proportional to the cosine of the angle A between the center line of the indicating tube and the horizontal or X axis determined by the level 396. The scale can be calibrated or set to zero using the same scale adjust mechanism 174 described above in connection with FIG. 4.

Thus the inclined manometer 390 employs many of the same components used in the other manometer versions described above so that it is equally easy to assemble and service. As described above, the scale 172 can be changed as needed, as can front plate 32 and tube 154, simply by removing the upper seal member 156 and cap 163 as described above in connection with FIG. 4.

Likewise, the well 302 and its fluid connection 406 to the indicating tube can be disassembled and cleaned easily if that is required.

It will be seen from the foregoing, then, that the manometer structure described herein is quite flexible and versatile and very easy to use and to maintain in good operating condition. Yet with all of these advantages, the instrument is still relatively economical to make because its parts are, for the most part, extruded or molded plastic parts which can be made in quantity at low cost. Moreover, most of those parts are interchangeable on a one-to-one basis between the various described manometer types so that it is not necessary to maintain an extensive inventory of different parts to handle different situations that might arise. Therefore, the manometer should find wide application wherever fluid pressure, level or flow is required to be measured or monitored.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. Manometer apparatus comprising
A. an elongated rigid frame
  1. formed as a channel having a rear wall and a pair of spaced-apart sidewalls, and
  2. defining an internal scale slide extending substantially the entire length of the frame;
B. an elongated open-ended manometer tube positioned in the frame;
C. upper closure means for closing the upper end the frame, said upper closure means including fluid conduit means extending through the closure means and establishing a fluid connection to one end of the tube;
D. lower closure means closing the lower end of the frame;
E. means for removeably securing the upper and lower closure means to the upper and lower ends of the frame;
F. an elongated, card-like scale, said scale being
  1. somewhat shorter than the frame, and
  2. slideably mounted in said scale slide for lengthwise movement therein; and
G. scale adjusting means releasably secured to the scale and extending outside of said frame for adjustably positioning the scale lengthwise in the frame relative to the tube.

2. The manometer apparatus defined in claim 1 wherein
A. said tube is U-shaped with its two legs extending between said closure means;
B. said scale slide supports said slide in a planar condition between said tube and the rear wall of the frame;
C. said frame includes support means extending substantially the entire length of the frame that engage and support the tube legs; and
D. said upper closure means include second fluid conduit means extending through the upper closure means and establishing a fluid connection to the opposite end of said tube.

3. The manometer apparatus defined in claim 2 wherein said frame further defines in its sidewalls an internal front plate slide in front of the tube.

4. The manometer apparatus defined in claim 3 and further including a transparent plate slideably received in said plate slide.

5. The manometer apparatus defined in claim 2 wherein
A. said frame further defines an internal slide in the rear wall of the frame; and
B. said scale adjusting means include a slider
 (1) releasably engaging the scale,
 (2) slideably positioned in said rearwall slide, and
 (3) projecting between the legs of said tube.

6. The manometer apparatus defined in claim 5 and further including
A. a transparent plate removably mounted to the frame in front of the tube so as to close the front of the frame; and
B. means defining a slot in the plate positioned opposite the slider.

7. The manometer apparatus defined in claim 1 and further including an elongated exterior keyway in the rear wall of the frame.

8. The manometer apparatus defined in claim 7 and further including support means releasably engaging in said keyway for supporting the frame in an upstanding position.

9. The manometer apparatus defined in claim 8 and further including means for leveling said support means.

10. The manometer apparatus defined in claim 1 wherein said upper and lower closure means each comprise
A. a seal member engaged to the corresponding end of the frame; and
B. a compression member engaging over and registering with said seal member.

11. The manometer apparatus defined in claim 1 wherein
A. said tube is straight and extends between said closure means;
B. said scale slide supports the scale in a curved condition so that its longitudinal axis is located behind the tube and its side edge margins extend forwardly about the opposite sides of the tube; and
C. said lower closure means include fluid conduit means extending through the lower closure means and establishing a fluid connection to the lower end of said tube.

12. The manometer apparatus defined in claim 11 wherein said frame further defines in its sidewalls an internal front plate slide in the front of said tube.

13. The manometer apparatus defined in claim 12 and further including a transparent plate slideably received in said plate slide.

14. The manometer apparatus defined in claim 11 wherein
A. one of said closure means include a throughhole; and
B. said scale adjusting means include fastener means
 (1) releasably fastened to said scale, and
 (2) extending out of said frame through said hole.

15. The manometer apparatus defined in claim 14 wherein said fastener means comprise
A. a nut secured to said scale; and
B. a screw member
 (1) threaded to said nut, and
 (2) extending through said hole.

16. The manometer apparatus defined in claim 11 and further including an elongated exterior keyway formed in the rear wall of the frame.

17. The manometer apparatus defined in claim 11 wherein said upper and lower closure means each comprise
A. a seal member engaged to the corresponding end of said frame; and
B. a compression member engaged over and registering with said seal member.

18. The manometer apparatus defined in claim 11 further including:
A. a manometer well having a bottom opening;
B. means for mounting the well relative to said frame; and
C. a fluid connection between the fluid conduit means in said lower closure means and said well opening.

19. The manometer apparatus defined in claim 18 wherein said mounting means comprise
A. an exterior longitudinal keyway in the rear wall of the frame;
B. a key projecting from said well and slideably received in said keyway; and
C. means for releasably fixing the position of said key along said keyway.

20. The manometer apparatus defined in claim 19 wherein said well comprises
A. a cup containing said bottom opening;
B. a cap threadably engaged over and closing the top of the cup; and
C. at least one fluid conduit extending into said cap.

21. The manometer apparatus defined in claim 20 and further including valve means in said cap for controlling the flow of fluid through said conduit.

22. The manometer apparatus defined in claim 18 wherein said mounting means comprise
A. support means;
B. means for securing said well in an upstanding position to said support means; and
C. means for angularly adjustably securing said frame to said support means adjacent to said well so that the longitudinal axis of said frame is oriented at an obtuse angle relative to the vertical axis of said well.

23. The manometer apparatus defined in claim 11 wherein
A. said upper closure means include a seal member engaged to the upper end of said frame; and
B. valve means engaged to and registering with said seal member for controlling the flow of fluid through said fluid conduit means in said upper closure means.

24. The manometer apparatus defined in claim 18 wherein the lower closure means comprise
A. a seal member engaged to the lower end of the frame and defining a passage leading to the lower end of the tube;
B. an adapter member engaged flush against the seal member and defining a pair of spaced apart through passages one of which communicates with said tube and the other of which communicates with said well opening;
C. a plate engaged flush against the underside of the adapter member, one of said adapter member and plate having a slot facing the other of said adapter member and plate that extends between said passages; and D. means for securing together said seal member, adapter member and plate so as to form said fluid connection.

25. The manometer apparatus defined in claim 1 and further including exterior longitudinal serrations formed in the side walls of said frame.

26. The manometer apparatus defined in claim 1 wherein
A. said frame defines an internal longitudinal slide in the rear wall of the frame;
B. one of said closure means include a throughhole; and
C. said scale adjusting means include
 (1) a slider
  a. releasably engaging the scale,
  b. slideably received in said rear wall slide, and
  c. defining a nut whose axis extends generally parallel to the tube, and
 (2) a screw member threaded to said slider nut and extending out of said frame through said hole so that by turning the screw member the scale can be adjusted longitudinally in the frame relative to the tube.

27. Manometer apparatus comprising
A. an elongated rigid frame formed as a channel having a rear wall and a pair of spaced apart sidewalls and having an interior surface defining a plurality of slides including
 (1) a planar scale slide which extends substantially the entire length of the frame,
 (2) a curved scale slide which extends substantially the entire length of the frame,
 (3) a longitudinal scale adjust slide in the rear wall of the frame, and
 (4) a front plate slide in the frame sidewalls extending substantially the entire lengths of those walls;
B. a manometer tube positioned in the frame;
C. upper and lower closure means engaged to the upper and lower ends of the frame, said upper closure means including fluid conduit means extending through the upper closure means and establishing a fluid connection to at least one end of the tube; and
D. means for removably securing the closure means to the frame.

28. The manometer apparatus defined in claim 27 wherein said frame interior surface further defines means extending inward from the side walls of said frame for engaging and supporting the manometer tube along substantially its entire length.

29. The manometer apparatus defined in claim 27 and further including
A. a well; and
B. means for establishing a fluid path between the interior of the well through the lower closure means to said tube.

30. The manometer apparatus defined in claim 29 wherein said lower closure means comprise
A. a seal member engaged to the lower end of the frame and defining a passage leading to said tube;
B. a second member engaged flush against the seal member and defining a pair of spaced apart through passages one of which communicates with the tube end the other of which communicates with the interior of said well;
C. a plate engaged flush against the underside of the second member, one of said second member and plate having a slot facing the other of said second member and plate; and
D. means for securing together said seal member, second member and plate to form a fluid tight passage between said well and said tube.

* * * * *